United States Patent
Ouellet

(10) Patent No.: US 11,174,037 B2
(45) Date of Patent: Nov. 16, 2021

(54) METHOD OF INCREASING FUEL CAPACITY AND KIT FOR SAME

(71) Applicant: Bell Helicopter Textron Inc., Fort Worth, TX (US)

(72) Inventor: Marc Ouellet, Sainte-Sophie (CA)

(73) Assignee: Textron Innovations Inc., Providence, RI (US)

( * ) Notice: Subject to any disclaimer, the term of this patent is extended or adjusted under 35 U.S.C. 154(b) by 414 days.

(21) Appl. No.: 16/196,912

(22) Filed: Nov. 20, 2018

(65) Prior Publication Data

US 2020/0156804 A1     May 21, 2020

(51) Int. Cl.
*B64D 37/04* (2006.01)
*B64D 37/06* (2006.01)
*B64D 37/16* (2006.01)

(52) U.S. Cl.
CPC ............. *B64D 37/04* (2013.01); *B64D 37/06* (2013.01); *B64D 37/16* (2013.01)

(58) Field of Classification Search
CPC ........ B64D 37/04; B64D 37/06; B64D 37/10; B60K 2015/03118; B60K 2015/03144; B60K 2015/03171; B65D 90/32
See application file for complete search history.

(56) References Cited

U.S. PATENT DOCUMENTS

| | | | | |
|---|---|---|---|---|
| 2,219,335 A | * | 10/1940 | Samiran | B67D 7/00 |
| | | | | 222/62 |
| 2,860,648 A | * | 11/1958 | Harrison | B64D 37/22 |
| | | | | 137/38 |
| 2,953,156 A | * | 9/1960 | Bryant | B64D 37/22 |
| | | | | 137/263 |
| 3,383,078 A | | 5/1968 | Shohet et al. | |
| 3,447,768 A | | 6/1969 | McQueen | |
| 4,860,972 A | | 8/1989 | Lannerd et al. | |
| 8,011,383 B2 | * | 9/2011 | Mowatt | B60K 15/06 |
| | | | | 137/572 |
| 8,172,182 B2 | * | 5/2012 | Tanner | B64D 37/04 |
| | | | | 244/135 C |
| 8,881,764 B2 | * | 11/2014 | Smith | B64D 37/14 |
| | | | | 137/565.01 |
| 9,919,807 B2 | | 3/2018 | Hernderson et al. | |
| 2003/0136355 A1 | * | 7/2003 | Gouzou | F02M 25/00 |
| | | | | 123/1 A |
| 2007/0163660 A1 | * | 7/2007 | Mowatt | B60K 15/06 |
| | | | | 137/572 |
| 2010/0051749 A1 | * | 3/2010 | Tanner | B64C 3/34 |
| | | | | 244/135 R |
| 2012/0111417 A1 | * | 5/2012 | Smith | B64D 37/00 |
| | | | | 137/14 |

(Continued)

OTHER PUBLICATIONS

Canadian Exam Report in related Canadian Patent Application No. 3,038,485 dated Jun. 19, 2020, 4 pages.

*Primary Examiner* — Joseph W Sanderson
(74) *Attorney, Agent, or Firm* — Lightfoot & Alford PLC

(57) ABSTRACT

A method of increasing fuel capacity of a fuel tank. The method includes creating a new filling port in the fuel tank, wherein the new filling port is vertically higher than the original filling port, sealing the original filling port, and installing an expansion tank above a top of the fuel tank, wherein the expansion tank is configured to permit expansion of fuel in the fuel tank beyond a maximum fill level of the fuel tank.

4 Claims, 3 Drawing Sheets

(56) References Cited

U.S. PATENT DOCUMENTS

| | | | |
|---|---|---|---|
| 2016/0252051 A1* | 9/2016 | Smith | B64D 37/22 244/17.11 |
| 2020/0108943 A1* | 4/2020 | Drancea | B64D 37/28 |

\* cited by examiner

METHOD OF INCREASING FUEL CAPACITY AND KIT FOR SAME

BACKGROUND

Aircraft fuel tanks are required to include an expansion volume to accommodate fuel volume variation caused by the large changes in temperature and air pressure during flight. Often, this expansion volume is merely empty space at the top of the main fuel tank. This portion of the main fuel tank cannot be filled with fuel because the filling port is located in the side of the main fuel tank. Accordingly, the main fuel tank can only be filled to the bottom edge of the filler neck, leaving the top of tank empty.

In order to increase the range of an aircraft, it is often desired to increase the fuel capacity thereof beyond the original threshold. This is usually accomplished by adding an auxiliary fuel tank that is remote from the main fuel tank. This auxiliary fuel tank is often located within a cargo compartment of the aircraft. In addition to usurping valuable cargo space, these auxiliary tanks often require additional structure to create the auxiliary tank, an auxiliary fuel pump, and an auxiliary fuel sensor, all of which increase the weight of the aircraft, the complexity of the installation, and the expense.

DETAILED DESCRIPTION

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a method of increasing the fuel capacity of a fuel tank as well as a kit for increasing the fuel capacity of a fuel tank. The method of increasing the fuel capacity includes relocating the filling port to a higher position on the fuel tank and adding an expansion tank vertically higher than the fuel tank to accommodate expansion of the fuel beyond a maximum fill level of the fuel tank. The kit may include some or all of the components required to make the modifications required to increase the fuel capacity. While the method and kit are shown on, and discussed for use with, a fuel tank on a rotorcraft, it should be understood that the method and kit described in this disclosure could be utilized to increase the capacity of any fluid storage tank.

Figure 1:
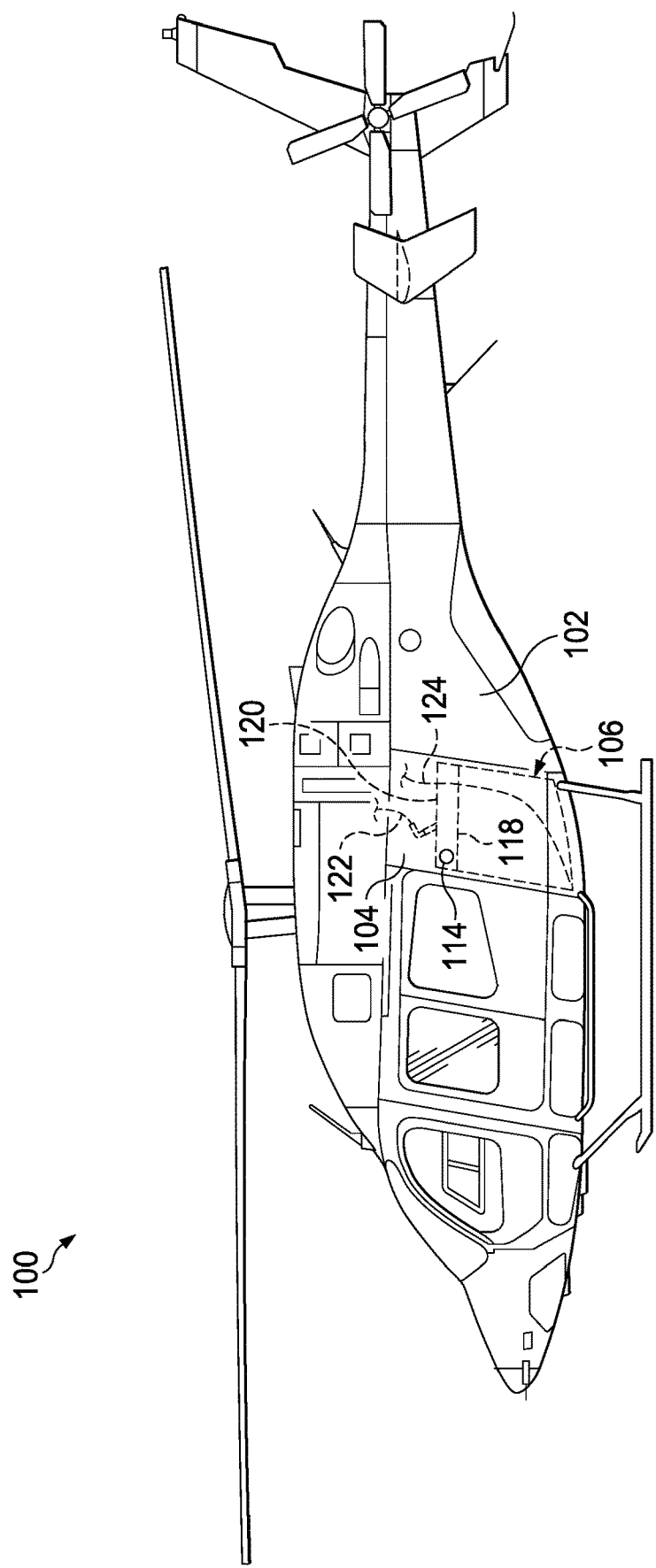
FIG. 1 is a side view of an aircraft showing a main fuel tank location.
Figure 2:
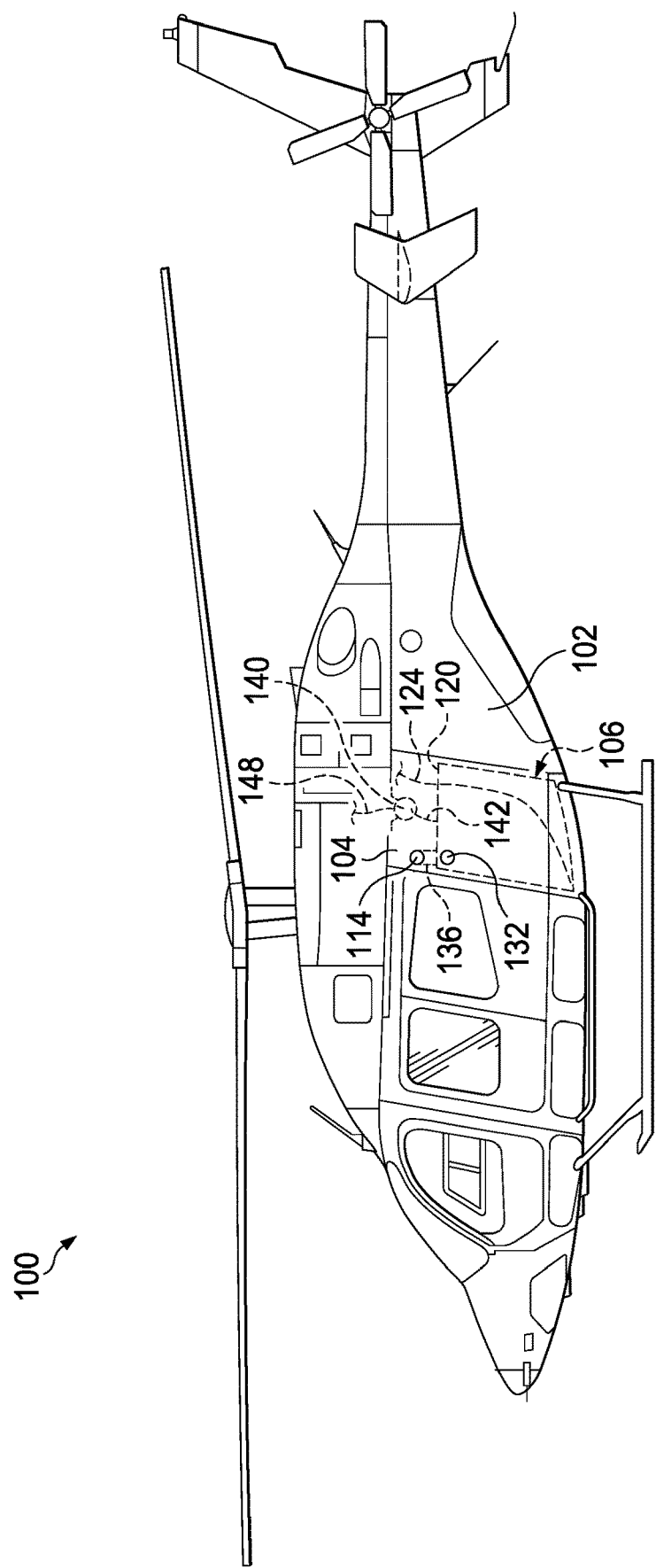
FIG. 2 is a side view of the aircraft of FIG. 1 having increased fuel capacity according to this disclosure.

FIGS. 1 and 2 show a rotorcraft 100 including a fuselage 102. Fuselage 102 includes a body panel 104 covering a fuel tank 106. FIG. 1 shows rotorcraft 100 with fuel tank 106 prior to increasing the fuel capacity thereof. FIG. 2 shows rotorcraft 100 with fuel tank 106 with an increased fuel capacity.

Figure 4:
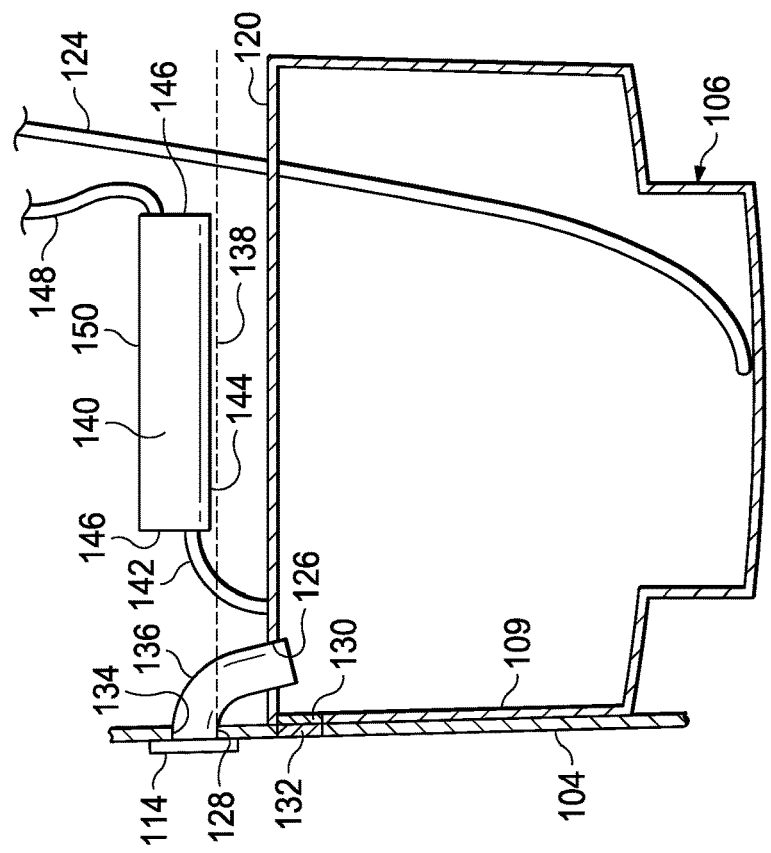
FIG. 4 is a cross-sectional rear view of the main fuel tank of FIG. 2 having increased fuel capacity according to this disclosure.
Figure 3:
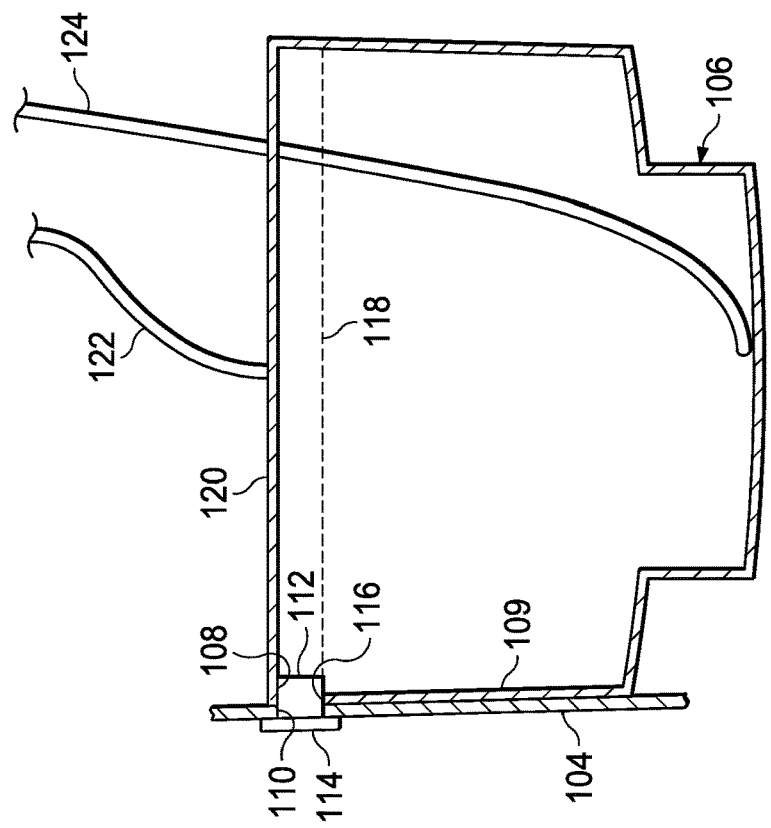
FIG. 3 is a cross-sectional rear view of the main fuel tank of FIG. 1.

FIGS. 3 and 4 show fuel tank 106 from a rear cross-sectional view. FIG. 3 shows fuel tank 106 prior to increasing the fuel capacity thereof. FIG. 4 shows fuel tank 106 with an increased fuel capacity.

As shown in FIGS. 1 and 3, prior to increasing the fuel capacity of fuel tank 106, fuel tank 106 includes an original filling port 108 extending through a side 109 thereof. Original filling port 108 is aligned with an original opening 110 in body panel 104, and there is an original filler neck 112 extending through original opening 110 and original filling port 108 with a fuel cap 114 covering original filling port 108. A bottom edge 116 of original filler neck 112 determines a maximum fill level 118. The volume between original maximum fill level 118 and a top 120 of fuel tank 106 serves as an expansion volume to accommodate expansion of fuel within fuel tank 106. The system also includes an original vent line 122 coupled to top 120 of fuel tank 106 and a fuel feeder line 124.

Referring now to FIGS. 2 and 4, the method of increasing the fuel capacity of fuel tank 106 is described below. The order of the below-recited steps is only an example. The below-recited steps need not occur in any particular order. First, a new filling port 126 is created. New filling port 126 may be created by any means of creating an opening in a fuel tank, including but not limited to drilling, sawing, boring, reaming, water jet cutting, etc. Moreover, fuel tank 106 may comprise a flexible fuel bladder that includes an access panel on top 120. As such, creating new filling port 126 may include replacing the existing access panel with a new panel that includes new filling port 126 extending therethrough. New filling port 126 is shown extending through top 120 of fuel tank 106, which would maximize the fuel capacity thereof. However, new filling port 126 may be located anywhere as long as it allows for a bottom edge 128 of a new filler neck 136 to be located higher than bottom edge 116 of original filler neck 112. Then, original filler neck 112 is removed from original filling port 108 and original opening 110. After original filler neck 112 is removed, original filling port 108 and original opening 110 are both sealed with patches 130 and 132, respectively. Patch 130 of fuel tank 106 may be made of any material and attached via any method that is suitable for sealing a fuel tank. Patch 132 of body panel 104 may be made of any material and attached via any method that is suitable for closing a hole in a body panel. Next, a new opening 134 is created in body panel 104 somewhere vertically higher than original opening 110. New opening 134 in body panel 104 may be created by any means of creating an opening in a panel, including but not limited to drilling, sawing, boring, reaming, water jet cutting, etc. In addition, it is possible that aircraft 100 may be manufactured with new opening 134 preexisting in body panel 104 to increase the ease of a future fuel capacity increase. This may include having new opening 134 covered with patch 132, wherein patch 132 may be a bolted-on cover that is configured to be removed and reused to cover original opening 110. As such, creating new opening 134 may include removing patch 132 from covering preexisting new opening 134. Then, new filler neck 136 is installed between new filling port 126 and new opening 134. Fuel cap 114 may be reused with new filler neck 136 or a new fuel cap may be utilized. Bottom edge 128 of new filler neck 136 is above top 120 of fuel tank 106, as such, a new maximum fill level 138 of fuel tank 106 is also above top 120 of fuel tank 106. Because the expansion volume that used to be located between original maximum fill level 118 and top 120 may now be filled with fuel, an expansion tank 140 is installed vertically higher than bottom edge 128 of new filler neck 136 to permit expansion of fuel beyond new maximum fill level 138. Expansion tank 140 is shown as a cylinder. However, expansion tank 140 may be any shape as long as it provides a sufficient ratio of expansion volume to fuel capacity of fuel tank 106. Expansion tank 140 is then connected to fuel tank 106 via a tube 142. Tube 142 may extend from top 120 of fuel tank 106 or from side 109 of fuel tank 106 proximate top 120 to a bottom 144 of expansion tank 140 or a side 146 of expansion tank 140 proximate bottom 144. Finally, a new vent line 148 is connected to expansion tank 140. New vent line 148 may extend from a top 150 of expansion tank 140 or from side 146 of expansion tank 140 proximate top 150. One or both of tube 142 and new vent line 148 may comprise sections of original vent line 122. That is, original vent line 122 may be severed and a first portion thereof extending from fuel tank 106 may be connected to expansion tank 140 and a second portion of severed original vent line 122 may be connected to expansion tank 140 as new vent line 148. However, tube 142 may be a new component and may also require creating a new attachment opening and sealing the original attachment location of original vent line 122. Alternatively, rather than including expansion tank 140, tube 142, and new vent line 148, original vent line 122 may be replaced by a large diameter line (not shown) having a large enough volume to function as both an expansion volume and a vent line.

Implementation of the above-described method of increasing the fuel capacity of a fuel tank may be facilitated by providing a kit including some, or all, of the components required. Moreover, each kit may be specifically tailored to the specific requirements of a particular aircraft. A kit for increasing the fuel capacity of fuel tank 106 may include any, or all, of the following items: expansion tank 140, new filler neck 136, tube 142, new vent line 148, mounting hardware configured for mounting expansion tank 140 to a frame of rotorcraft 100, mounting hardware for securing new filler neck 136, a filling port template indicating the correct location to create new filling port 126, a fuel tank patch kit configured to seal original filling port 108, a fuel cap opening template indicating the correct location to create new opening 134 in body panel 104, a new access panel including new filler port 126 extending therethrough, and a body panel patch kit configured to seal original opening 110 in body panel 104. The kit may also include any tools required for installation of the components. For example, the kit may include correctly sized drill bits for creating new filling port 126 and new opening 134, as well as stirring sticks and brushes from preparing and spreading adhesives for the patch kits, etc.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
a fuselage, comprising a body panel;
a fuel tank located within the fuselage, adjacent the body panel;
an expansion tank mounted vertically higher than the fuel tank, the expansion tank being configured to permit expansion of fuel beyond a maximum fill level of the fuel tank;
a tube extending between the fuel tank to the expansion tank; and
a vent line extending from the expansion tank;
wherein the fuel tank is vented via a path extending through the expansion tank and the vent line; and
wherein return of fuel from the expansion tank to the fuel tank is gravity driven.

2. The aircraft of claim 1, further comprising:
a sealed original filler port on a side of the fuel tank.

3. The aircraft of claim 2, further comprising:
a sealed original fuel port opening on the body panel.

4. The aircraft of claim 3, further comprising:
a filler neck extending between a new filling port and a new fuel cap opening.

\* \* \* \* \*